US010918023B2

(12) United States Patent
Abrams

(10) Patent No.: US 10,918,023 B2
(45) Date of Patent: Feb. 16, 2021

(54) PLANT HUSBANDRY SYSTEM AND MULCH BARRIER

(71) Applicant: Richard Abrams, Odenton, MD (US)

(72) Inventor: Richard Abrams, Odenton, MD (US)

(*) Notice: Subject to any disclaimer, the term of this patent is extended or adjusted under 35 U.S.C. 154(b) by 110 days.

(21) Appl. No.: 15/884,546

(22) Filed: Jan. 31, 2018

(65) Prior Publication Data
US 2018/0220596 A1 Aug. 9, 2018

Related U.S. Application Data

(60) Provisional application No. 62/454,098, filed on Feb. 3, 2017.

(51) Int. Cl.
A01G 13/02 (2006.01)
A01G 13/00 (2006.01)

(52) U.S. Cl.
CPC ..... *A01G 13/0237* (2013.01); *A01G 13/0281* (2013.01); *A01G 2013/006* (2013.01)

(58) Field of Classification Search
CPC ............ A01G 13/0237; A01G 13/02; A01G 13/0281; A01G 13/0256; A01G 13/0262
See application file for complete search history.

(56) References Cited

U.S. PATENT DOCUMENTS

| 313,424 A * | 3/1885 | Hughes | A01G 13/0281 47/32 |
| 4,858,378 A * | 8/1989 | Helmy | A01G 13/0281 47/33 |
| 4,896,453 A | 1/1990 | Jacob | |
| 5,181,952 A | 1/1993 | Burton et al. | |
| 5,301,460 A | 4/1994 | Corbitt | |
| 5,396,731 A | 3/1995 | Byrne | |
| 5,586,753 A | 12/1996 | Michiaels | |
| 5,644,998 A | 7/1997 | Krolick | |
| 5,672,434 A | 9/1997 | Dalebroux et al. | |
| 5,729,929 A | 3/1998 | Burke | |
| 5,746,546 A | 5/1998 | Hubbs et al. | |
| 5,853,541 A | 12/1998 | Monroe et al. | |
| 5,866,269 A | 2/1999 | Dalebroux et al. | |
| 5,873,194 A | 2/1999 | Caldwell | |
| 5,910,514 A | 6/1999 | Greenburg et al. | |
| 6,195,935 B1 | 3/2001 | Bellucci et al. | |
| 6,312,826 B1 | 11/2001 | Shogren | |
| 6,349,500 B1 | 2/2002 | Popham | |
| 6,360,478 B1 | 3/2002 | Spittle | |

(Continued)

FOREIGN PATENT DOCUMENTS

| EP | 1281813 | 2/2003 |
| EP | 1584750 | 10/2005 |

(Continued)

*Primary Examiner* — Kristen C Hayes
(74) *Attorney, Agent, or Firm* — The Roy Gross Law Firm, LLC; Roy Gross

(57) ABSTRACT

A method and system for inhibiting the growth of unwanted plants at and about the base of trees, shrubs, and other ornamental and/or commercial plants; while providing protection to the trunk, stalk, root crown, and/or plant roots from damage inherently caused by mulching material itself, and from damage caused landscaping or cultivation techniques, while promoting the oxygenation of the plant, and additionally avoiding and/or treating pathogen infection or infestation of the plant.

12 Claims, 9 Drawing Sheets

(56) References Cited

U.S. PATENT DOCUMENTS

| | | |
|---|---|---|
| 6,523,299 B2 | 2/2003 | Morris |
| 6,615,536 B2 | 9/2003 | Carvin |
| 6,640,490 B1 | 11/2003 | Boehringer |
| 6,672,001 B1 | 1/2004 | Ali et al. |
| 6,705,044 B2 | 3/2004 | Clancey |
| 6,984,090 B2 | 1/2006 | Allen |
| 7,160,054 B2 | 1/2007 | Smiley |
| 7,452,159 B2 | 11/2008 | Alexander |
| 7,685,764 B2 | 3/2010 | Moore |
| 7,735,250 B2 | 6/2010 | Menzie et al. |
| 10,028,456 B2 * | 7/2018 | Mackichan ............ A01G 17/04 |
| 2004/0200140 A1 | 10/2004 | Alexander |
| 2004/0237387 A1 | 12/2004 | McCamy |
| 2005/0089377 A1 | 4/2005 | Allen |
| 2005/0172549 A1 * | 8/2005 | Allen ................. A01G 13/0237 47/32.4 |
| 2005/0274071 A1 | 12/2005 | Allen |
| 2006/0064929 A1 | 3/2006 | Allen |
| 2006/0072968 A1 | 4/2006 | Smiley |
| 2006/0196114 A1 | 9/2006 | Allen |
| 2007/0009665 A1 | 1/2007 | Alexander |
| 2007/0243789 A1 | 10/2007 | Allen |
| 2008/0022588 A1 | 1/2008 | Tijerina |
| 2008/0025796 A1 | 1/2008 | Allen |
| 2008/0120901 A1 | 5/2008 | Hinsperger |
| 2008/0202023 A1 | 8/2008 | Moore |
| 2015/0319944 A1 * | 11/2015 | Mackichan ............ A01G 29/00 47/45 |
| 2016/0198649 A1 | 7/2016 | Allen |
| 2017/0118928 A1 | 5/2017 | Allen |
| 2018/0206418 A1 * | 7/2018 | Stover ..................... A01G 9/28 |

FOREIGN PATENT DOCUMENTS

| | | |
|---|---|---|
| EP | 1607525 | 12/2005 |
| FR | 2356361 | 1/1978 |

* cited by examiner

PLANT HUSBANDRY SYSTEM AND MULCH BARRIER

CROSS REFERENCE TO RELATED APPLICATIONS

This application claims the benefit of Provisional U.S. Patent Application 62/454,098 filed Feb. 3, 2017 entitled PLANT HUSBANDRY SYSTEM. The contents of this application are incorporated by reference in its entirety.

FIELD OF THE INVENTION

The present invention relates to plant husbandry systems; and more specifically relates to methods and systems for inhibiting the growth of unwanted plants at and about the base of trees, shrubs, and other ornamental and/or commercial plants; and provides protection to the trunk, stalk, root crown, and/or plant roots from damage inherently caused by mulching material itself, and from damage caused by landscaping or cultivation techniques. The present invention promotes the oxygenation of the plant roots, and additionally avoids and/or treats pathogen infection or infestation of the plant.

BACKGROUND OF THE INVENTION

The practice of mulching is well known in the field of plant husbandry. A mulch is typically a layer of biological or synthetic material placed on an area of soil about or around a plant for among other reasons, to trap, retain, or conserve moisture within and below the mulch material, to improve soil fertility below and about the mulch, to inhibit or prevent weed growth, and to improve or enhance the ornamentation and visual appeal of the area mulched and about the plant itself.

Mulches typically may be organic material such as chipped barks, pine needles, chipped wood, ornamental rocks, expanded clay, or other biologic, agricultural, or geologic material. Some mulches are made of synthetic materials such as but not limited to rubber, polyurethane, or other man-made substances.

Mulches typically are placed on bare soil, and/or on-top of weed inhibiting meshes or nets, around existing or newly established plants, scrubs, and trees, and may include natural manures or composts. Mulching is practiced in commercial crop cultivation, gardening, landscaping; and when applied properly may dramatically improve soil productivity by the leaching of water and nutrients into the soil from the mulch.

Typically, mulch is applied in flat layers approximately two to six inches in depth on a soil or surface, and may also be and commonly is "piled around" and about the truck and/or root-crown of plants in what is referred to as "volcano mulching."

So-called volcano mulching is highly desired by agricultural growers, landscapers, gardeners, and other such "grounds keepers" for its ornamental and visual appeal; as well as concentrating beneficial water and nutrients around a plant.

However, depending upon the type of mulch being used, volcano mulching may actually harm a given tree, scrub, or other plant by inhibiting oxygen supplies about the trunk, root-crown, and/or roots; and/or harm the plant by retaining an overabundance of moisture about the plant roots—potentially facilitating and causing infestation and/or infection by a pathogen such as but not limited to *pythium, fusarium, verticillium*, and *rizoctonia*; and if left unremedied lead to plant death.

As is also well known in agriculture and horticulture, in many plant varieties, high root temperatures can cause root system oxygen starvation. As temperatures increase, oxygen solubility dramatically decreases and the plant essentially suffocates. Plant injury from hypoxia (low, or no, oxygen at the roots) may take several forms, each differing in severity and depending upon the plant family and variety.

Insufficient oxygen reduces the permeability of roots to water and results in the accumulation of toxins, thus both water and minerals cannot be absorbed in sufficient quantities to support plant growth, particularly under plant stress conditions.

This is accompanied by slower rates of photosynthesis and carbohydrate transfer, and over time plant growth is reduced and crop health and yields are negatively affected. If oxygen starvation continues, mineral deficiencies in the plant will set-in, roots will die back, and plants will become stunted. Under these continuing anaerobic conditions, plants produce a stress hormone, ethylene, which accumulates in the roots and causes the collapse of root cells. Once root injury and deterioration caused by anaerobic conditions has begun, common opportunist pathogens can easily infect and rapidly destroy the plant.

What is desired therefore is a plant husbandry method and system which provides and facilitates a "volcano mulching appearance" about a plant trunk, stem, root-crown, and/or roots, while allowing for an adequate supply of oxygen to and about the plant roots.

It is further desired to provide a plant husbandry method and system allowing for excess amounts of moisture absorbed by a mulch to leech into the soil below.

It is further desired to provide a plant husbandry method and system allowing for and facilitative of adequate moisture evaporation of and about a plant and the mulching material itself, and thus inhibiting damage occurring to the plant by opportunistic pathogens.

It is further desired to provide a plant husbandry method and system allowing for and facilitative of the growth of a plant including a capability to be adjusted in circumference to accommodate a plurality of plant types, and plant stem or trunk circumferences.

It is further desired to provide a plant husbandry method and system allowing for and facilitative of the growth of a plant including a capability to expand in circumference as the plant matures.

It is further desired to provide a plant husbandry method and system allowing for and facilitative of the growth of a plant including a capability to maintain a selected distance from the plant.

It is further desired to provide a plant husbandry method and system allowing for and facilitative of the irrigation of a plant via communication with a water and/or nutrient source.

SUMMARY OF THE INVENTION

To improve upon the prior art, it is therefore an object of the present invention to provide a plant husbandry method and system which provides and facilitates a "volcano mulching appearance" about a plant trunk, stem, root-crown, and/or roots, while allowing for an adequate supply of oxygen to and about the plant roots.

It is another object of the present invention to provide a plant husbandry method and system allowing for excess amounts of moisture absorbed by a mulch to leech into the soil below.

It is another object of the present invention to provide a plant husbandry method and system allowing for and facilitative of adequate moisture evaporation of and about a plant and the mulching material itself, and thus inhibiting damage occurring to the plant by opportunistic pathogens.

It is another object of the present invention to provide a plant husbandry method and system allowing for and facilitative of the growth of a plant including a capability to be adjusted in circumference to accommodate a plurality of plant types, and plant stem or trunk circumferences.

It is another object of the present invention to provide a plant husbandry method and system allowing for and facilitative of the growth of a plant including a capability to expand in circumference as the plant matures.

It is another object of the present invention to provide a plant husbandry method and system allowing for and facilitative of the growth of a plant including a capability to maintain a selected distance from the plant.

It is another an object of the present invention to provide a plant husbandry method and system allowing for and facilitative of the irrigation of a plant via communication with a water and/or nutrient source.

These and other objects of the invention are achieved by providing a mulch barrier surrounding and protecting the base of a plant, said mulch barrier comprising: a rigid or semi-rigid external housing, said external housing having at least one bore to allow the passage of water through said housing, said housing completely surrounding the plant; a base connected to said rigid or semi-rigid external housing, said base supporting said external housing; and a ramp member, said ramp member arranged on the exterior of the external housing and comprising at least one spike, wherein said ramp member is connected on one end of said external housing and on the other end of said base, and wherein said ramp member holds groundcover, mulch or other material in place, thereby protecting the base of the plant.

In certain embodiments, the mulch barrier includes at least one spacer, said at least one spacer connected on one end to said external housing and on the other end to the tree.

In certain embodiments, the spacer is adjustable and is configured to control the distance between the external housing at the tree.

In certain embodiments, the spacer is ratcheted so that its distance can vary.

In certain embodiments, the external housing of the mulch barrier is made of plastic or a rigid material.

In certain embodiments, the base includes at least one bore to allow water to flow down through the mulch.

In certain embodiments, the base includes spikes to attach the base to the ground.

In certain embodiments, the ramp member includes spikes to hold the mulch in place.

In certain embodiments, the mulch barrier further comprises an extension unit, said extension unit connected to said external housing to allow the external housing to expand and contract based upon the size of the plant.

In certain embodiments, the extension unit is connected to said external housing via a point and/or clasp.

In certain embodiments, the housing has a cylinder shape.

In certain embodiments, the device has plastic teeth sticking up to allow mulch to stay in place.

In certain embodiments, the base is perforated to allow water to the ground.

In certain embodiments, the side of the housing facing the plant/tree has small vertical loops lining the back and spaced out every 3-5 inches.

In certain embodiments, the side of the housing has slots for spacers to be attached to the barrier. In certain embodiments, the spacer ensures the barrier is the appropriate distance from the plant/tree.

In certain embodiments, the side of the housing facing the mulch will have a ramp like appearance with perforations to allow water to travel through.

Other objects of the invention are achieved by providing a mulch barrier surrounding and protecting the base of a plant, said mulch barrier comprising: a rigid or semi-rigid external housing, said external housing having at least one bore to allow the passage of water through said housing, said housing completely surrounding the plant; at least one spacer, said at least one spacer connected on one end to said external housing and on the other end to the tree; and a ramp, said ramp arranged on the exterior of the external housing and comprising at least one spike, wherein said ramp is connected on one end of said external housing, and wherein said ramp holds groundcover, mulch or other material in place, thereby protecting the base of the plant.

Other objects of the invention are achieved by providing a mulch barrier surrounding and protecting the base of a plant, said mulch barrier comprising: a first external housing, said first external housing comprising a first vertical body and a base; a second external housing, second external housing comprising a vertical body and a base, wherein the first external housing and the second external housing each have at least one bore to allow the passage of water through said housing, said housing completely surrounding the plant, wherein the first external housing and the second external housing are connected to one another to form a continuous external housing around the base of the plant, wherein the first external housing and the second external housing are rigid or semi-rigid, wherein the first external housing and the second external housing hold groundcover, mulch or other material in place, thereby protecting the base of the plant.

In certain embodiments, much barrier includes at least one spacer, said at least one spacer connected on one end to said external housing and on the other end to the tree.

In certain embodiments, the spacer is adjustable and is configured to control the distance between the external housing at the tree.

Other objects of the invention and its particular features and advantages will become more apparent from consideration of the following drawings and accompanying detailed description. It should be understood that the detailed description and specific examples, while indicating the preferred embodiment of the invention, are intended for purposes of illustration only and are not intended to limit the scope of the invention.

DETAILED DESCRIPTION OF THE INVENTION

Figure 1B:
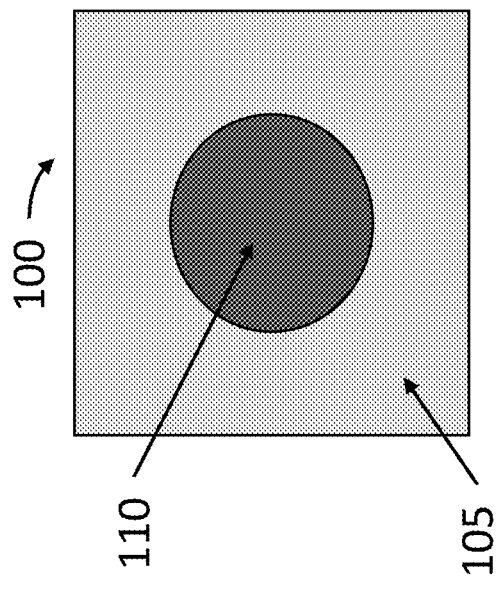
FIGS. 1A-1D is a top view of various mulch barriers according to embodiments of the present invention.
Figure 1D:
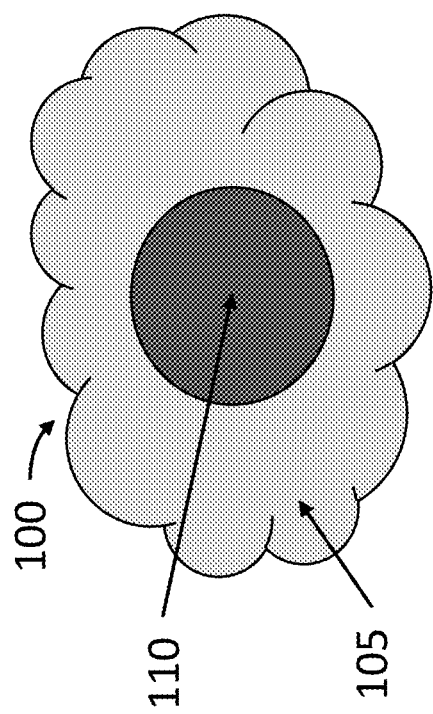
Figure 1A:
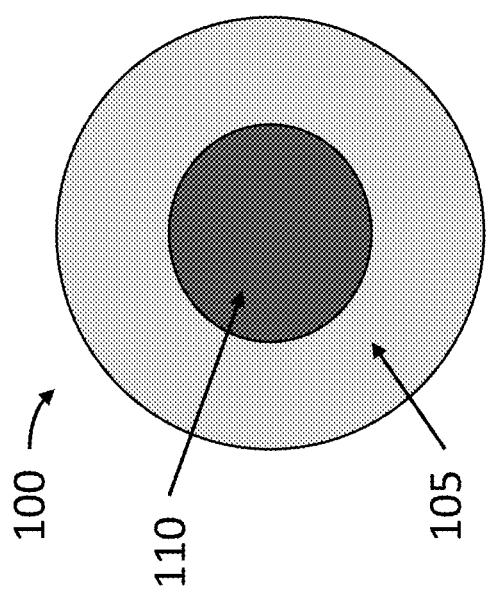
Figure 1C:
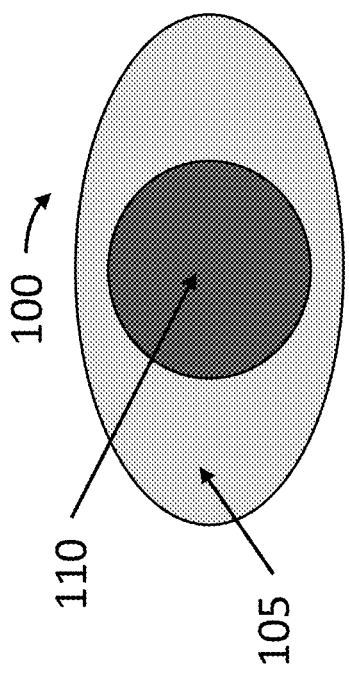

In the following description, numerous details are set forth for the purpose of explanation. However, one of ordinary skill in the art will realize that the invention may be practiced without the use of these specific details. For instance, the techniques described below are described in a specified order, but other embodiments may change the order of the operations while still embodying the current invention.

In certain embodiments, the inventive method and system comprises a ridged and/or semi-ridged material to form a barrier between a plant and a mulch.

In certain embodiments, the inventive method and system further comprises a material configured to allow water and other liquids to pass therethrough.

In certain embodiments, the inventive method and system further comprises a material configured as and to be selectively permeable.

In certain embodiments, the inventive method and system further comprises a material configured of and to be selectively biodegradable over time.

In certain embodiments, the inventive method and system further comprises a material configured to be placed upon and cover a selected area around and away from the trunk or stem of a plant.

In certain embodiments, the inventive method and system further comprises a material configured to prevent and/or inhibit the germination and/or growth of weeds about or around a plant.

In certain embodiments, the inventive method and system further comprises a material configured to provide nutrients to a plant.

In certain embodiments, the inventive method and system further comprises a material configured along an axis approximately parallel to the longitudinal axis of a trunk and/or stem of a plant.

In certain embodiments, the inventive method and system further comprises a material configured along an axis approximately perpendicular to the longitudinal axis of a trunk and/or stem of a plant.

In certain embodiments, the inventive method and system further comprises a material configured along an axis neither approximately perpendicular nor parallel to the longitudinal axis of a trunk and/or stem of a plant.

In certain embodiments, the inventive method and system further comprises a material configured along an axis neither approximately perpendicular nor parallel to the longitudinal axis of a trunk and/or stem of a plant; and wherein mulch placed thereon remains fixed.

In certain embodiments, the inventive method and system further comprises a material configured along an axis neither approximately perpendicular nor parallel to the longitudinal axis of a trunk and/or stem of a plant.

In certain embodiments, the inventive method and system further comprises a material configured along an axis approximately 45 degrees from the longitudinal axis of a trunk and/or stem of a plant.

In certain embodiments, the inventive method and system further comprises a material configured along an axis neither approximately perpendicular nor approximately parallel to the longitudinal axis of a trunk and/or stem of a plant; and wherein mulch placed thereon remains fixed.

In certain embodiments, the inventive method and system further comprises a material configured to be adjustable to establish and maintain a selected circumrenal distance from a plant.

In certain embodiments, the inventive method and system is configured in a cylinder shape around the base of a shrub/tree. The side facing the mulch will have a ramp like appearance with perforations to allow water to travel through. It will also have small plastic teeth sticking up to allow the mulch to stay in place. The bottom may also be perforated to allow water to the ground. The back (facing the shrub/tree) may be made of solid plastic. It may have three small vertical loops lining the back and spaced out every 3-5 inches.

In certain embodiments, the device can be cut and/or fit to the size of the tree, or add additional links to expand to the size of a shrub/tree. The back may also have slots for plastic spacers to be attached.

In certain embodiments, the spacer ensures the barrier is the appropriate distance from the tree. In certain embodiments, the spacer will be 6 to 8 inches, but can be larger or smaller depending upon the size of the plant or tree.

An intent of the mulch barrier design allows landscape professionals and general home owners to protect the health of their ornamentals. It will prevent the typical mulch volcanoes in use today, and eliminate the need to constantly cut down trees/shrubs due to root decay or other known issues of improper mulching. It will still give the volcano appearance most professionals and homeowners desire, without the negative impact to the tree.

In certain embodiments, the mulch barrier may be made of biodegradable materials or materials that degrade over time such as during a growing season.

It is contemplated that the mulch barrier may be selectively permeable to water and nutrients and configured to achieve a desired moisture level around and about the plant, as well as below the mulch barrier at the level of the soil and at the roots of the plant below.

It is contemplated that the mulch barrier system includes an irrigation system in fluid communication with a water and/or nutrient source either gravity fed, or under pressure from a utility or well.

In certain embodiments, a mulch barrier may be made of natural or synthetic material and placed and/or secured around and about a plant trunk, stem, root-crown, and/or roots to separate and retain in-place mulch placed thereon from the plant.

It is contemplated that the barrier may comprise a natural material such as but not limited to: a wood, a mineral, stone, a leather, a rubber, bone, a ceramic, a glass, a plant protein or cellulose, an animal protein or cellulose, and combinations thereof.

It is also contemplated that the barrier may comprise a man-made or synthetic material such as but not limited to: a plastic, a polymer, a composite, a metal alloy, a ceramic, a glass, a conductor, and/or a semi-conductor, and combinations thereof.

Referring to FIGS. 1A-1D, a mulch barrier method and system (100) is shown having various configurations. It is contemplated the mulch barrier (105) method and system (100) may be configured about and around a plant or tree (110) as viewed from above in accordance with a user's requirements and/or aesthetic wishes; that is, in a circular, oval, square, diamond, irregular, or other geologic footprint or manner similar to as depicted in FIGS. 1A-1D.

Figure 2:
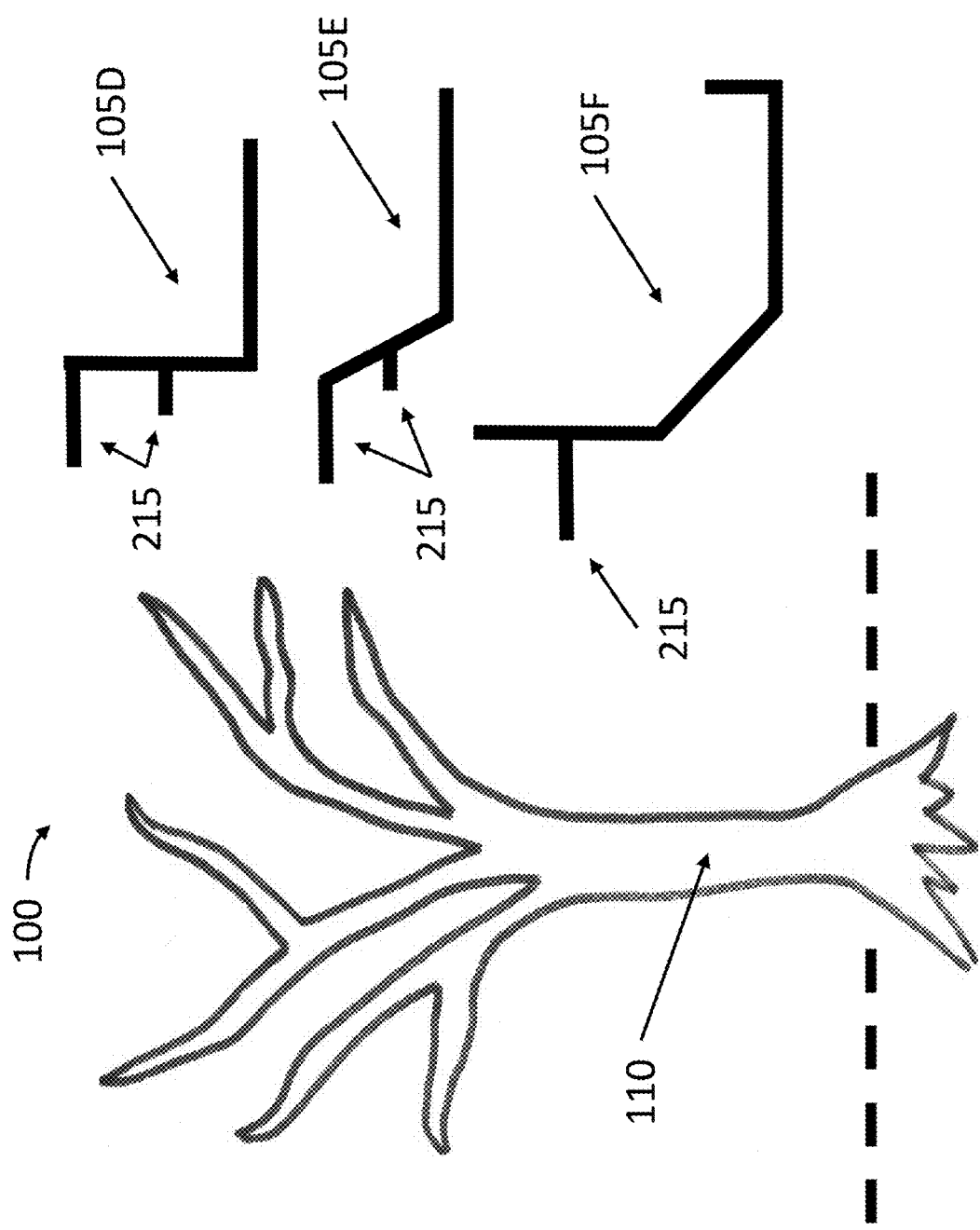
FIG. 2 is a view of various mulch barriers and their arrangements around a plant or tree according to embodiments of the present invention.

Referring to FIG. 2, a mulch barrier (105) is shown having various configurations as viewed from the side. It is contemplated that the mulch barrier (105) may be configured about and around a plant or tree (110) as viewed from the side perpendicular to the plant trunk or stem (110) similar as to mulch barrier (105A, 105D), at an angle in relation to the plant (105B, 105E), or curved (Not Shown), or comprise both parallel and angled portions (105C, 105F) in relation to the plant or tree (110); similar to as depicted in FIG. 2.

It is also contemplated that the mulch barrier (105) may be configured to include integral or detachable spacers, struts, arcs, erratics, gaskets, or other system (215) to establish, maintain, and/or adjust a distance between the mulch barrier (105) and the plant or tree (110), similar to as depicted in FIG. 2.

Figure 3:
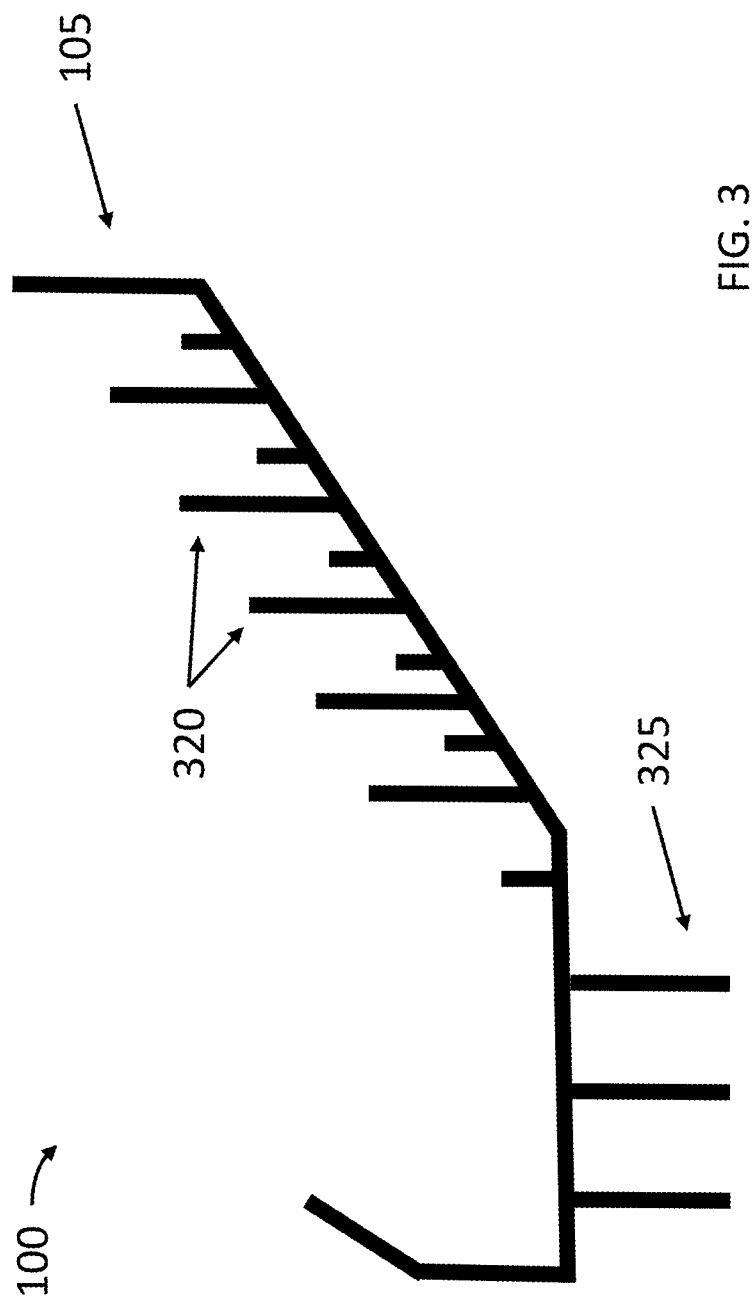
FIG. 3 is a view of a mulch barrier according to an embodiment of the present invention.
Figure 6:
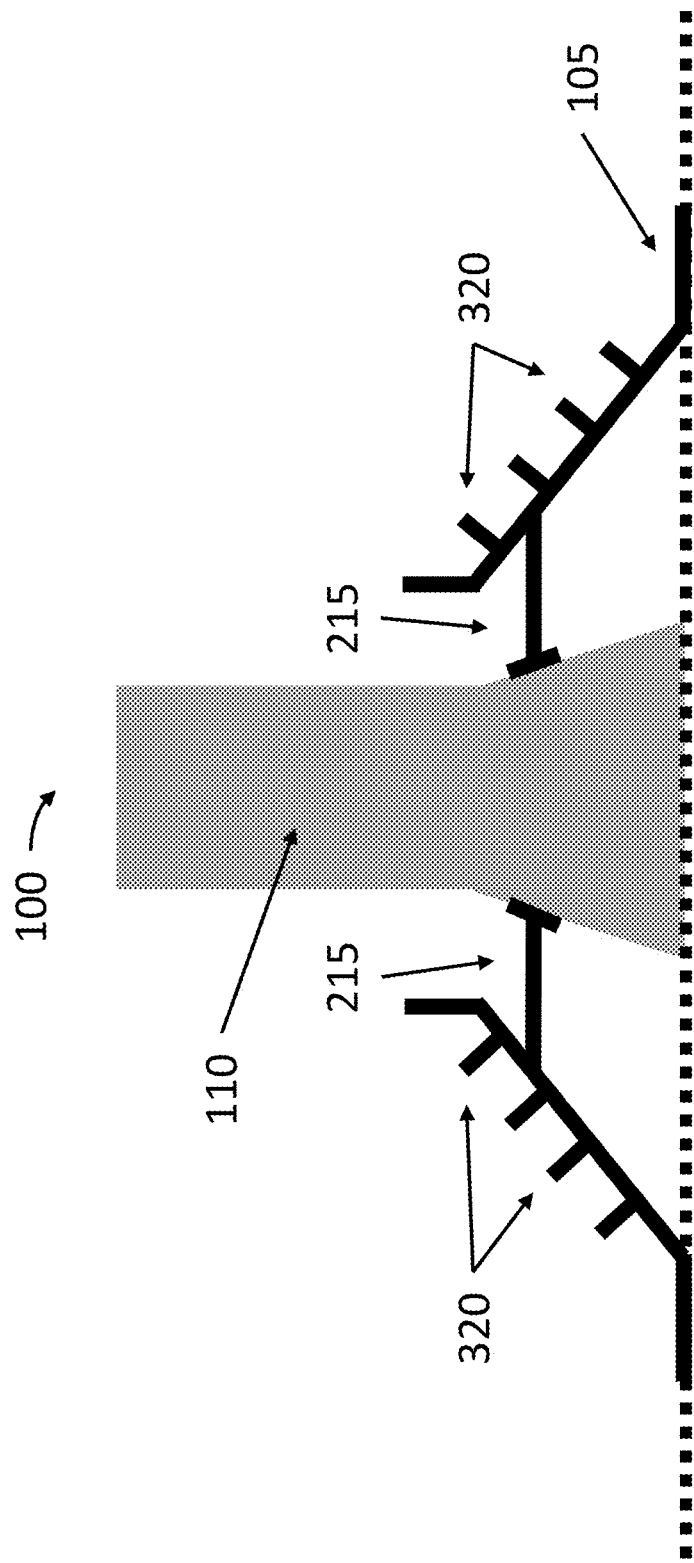
FIG. 6 is a view of a mulch barrier according to an embodiment of the present invention.
Figure 7:
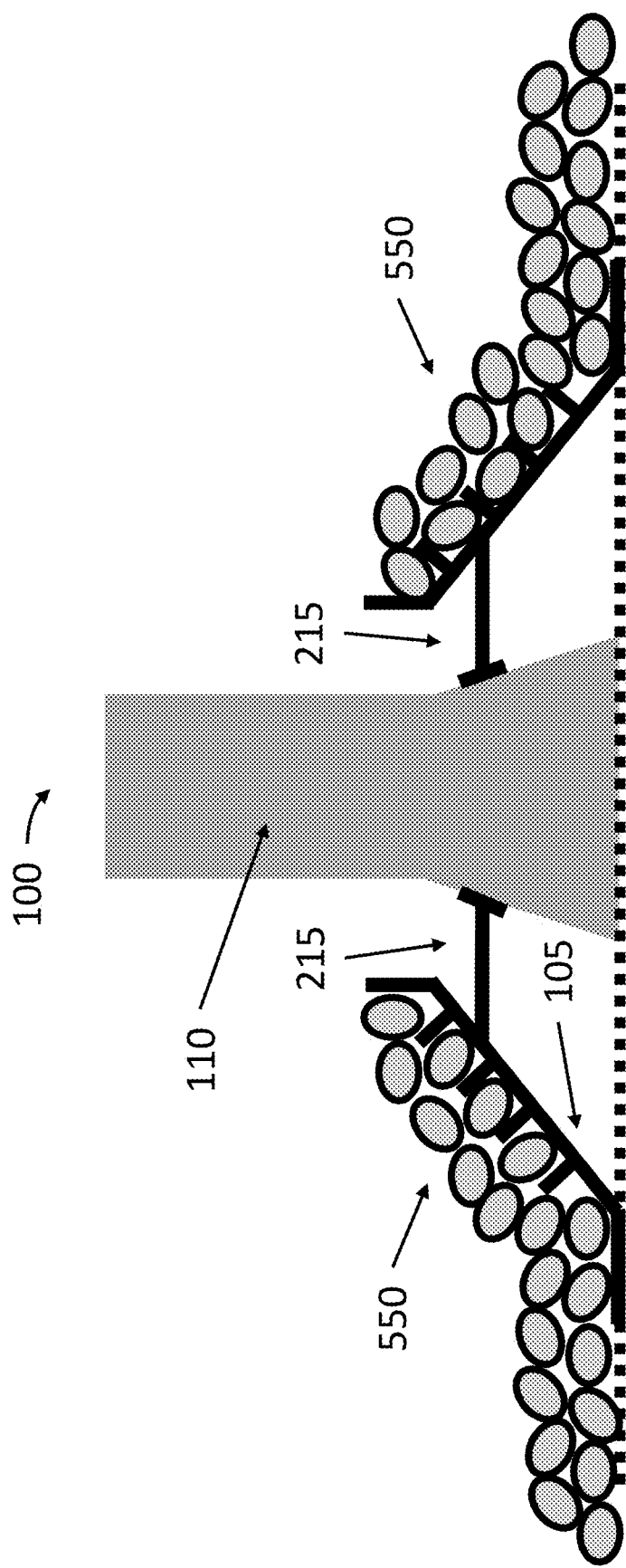
FIG. 7 is a side view of a mulch barrier according to an embodiment of the present invention.

Referring to FIG. 3, FIG. 6, and FIG. 7, integral or detachable spokes or spikes (320) are shown which depict the mulch barrier (105) in a configuration to hold mulch or other material away from a plant or tree while preventing the mulch or material from sliding along and/or down an angled face of the mulch barrier (105). Also depicted in FIG. 3, FIG. 6, and FIG. 7 are integral or detachable spokes or spikes (325) to facilitate securing or anchoring the mulch barrier (105) to the ground or other surface.

Figure 4:
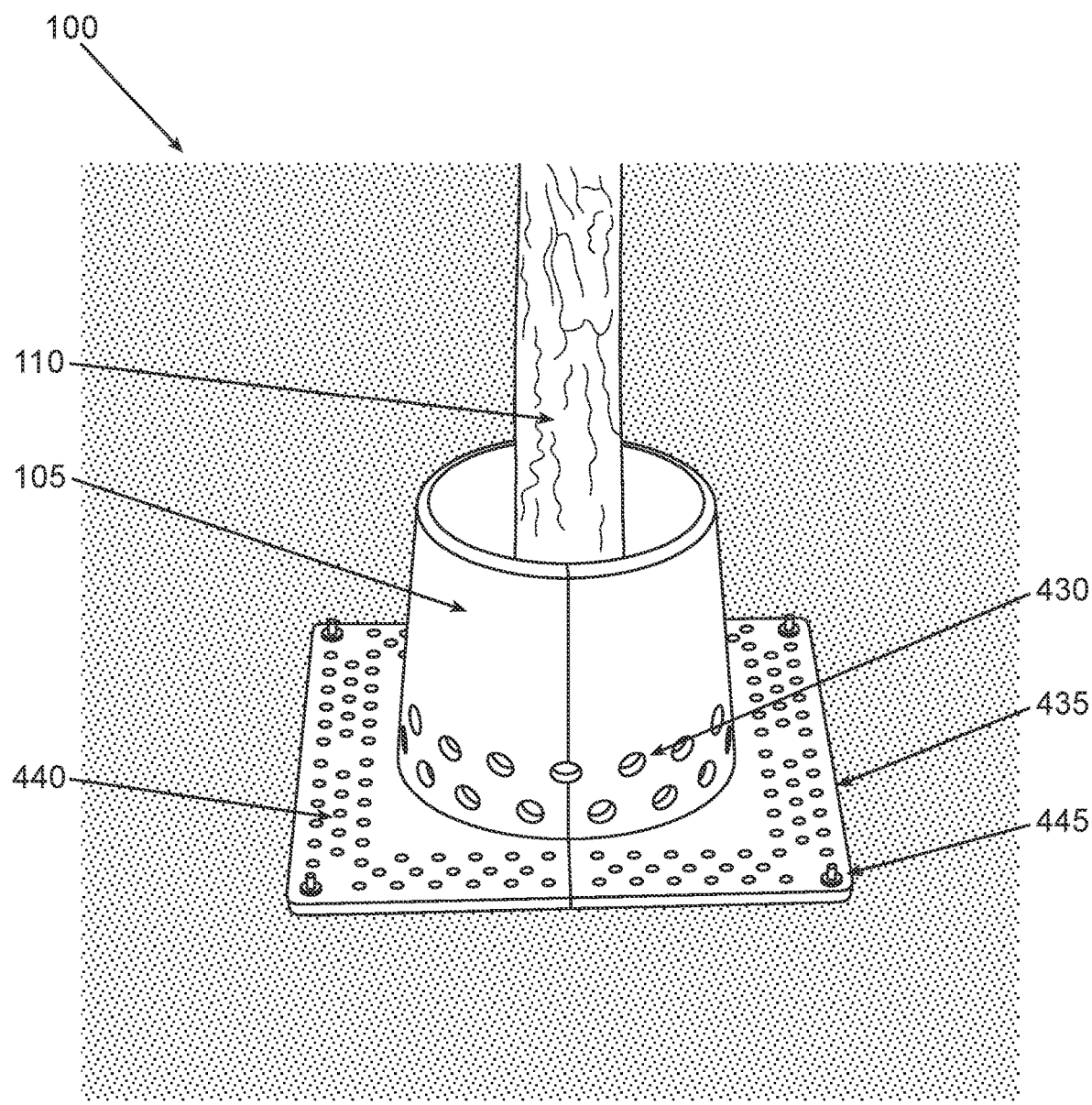
FIG. 4 is a perspective view of a mulch barrier according to an embodiment of the present invention.

Referring to FIG. 4, an exemplary mulch barrier (105) is shown. FIG. 4 depicts a mulch barrier (105) having a plastic side (which is rigid) and also having circular holes or bores (430) in the plastic side to allow water to drain out. The mulch barrier (105) may also include drainage holes or bores (435) at the base to allow for water drainage and leaching of desired nutrients, and/or herbicides from the mulch, and the like.

In certain configurations, 2-inch or 4-inch spacers (Not Shown) are used to keep the mulch barrier form encroaching upon a plant or tree (110). The mulch barrier (105) may include slits (Not Shown) which allow the spacers to be held in place on a plastic side of the mulch barrier. In certain embodiments, the spaces may be larger or small than 2 or 4 inches.

FIG. 4 also depicts a mulch barrier (105) having a base with holes (435). In certain embodiments, the base (435) may comprise a very flexible plastic that allows the base (435) to conform to the ground or other surface; and may include drainage holes or bores (440) allowing water or other nutrients to flow down through the mulch into the ground below. In certain embodiments, the base (435) includes lawn care spikes (445) which facilitate the mulch barrier (105) being attached or secured to the ground or other surface.

Figure 5:
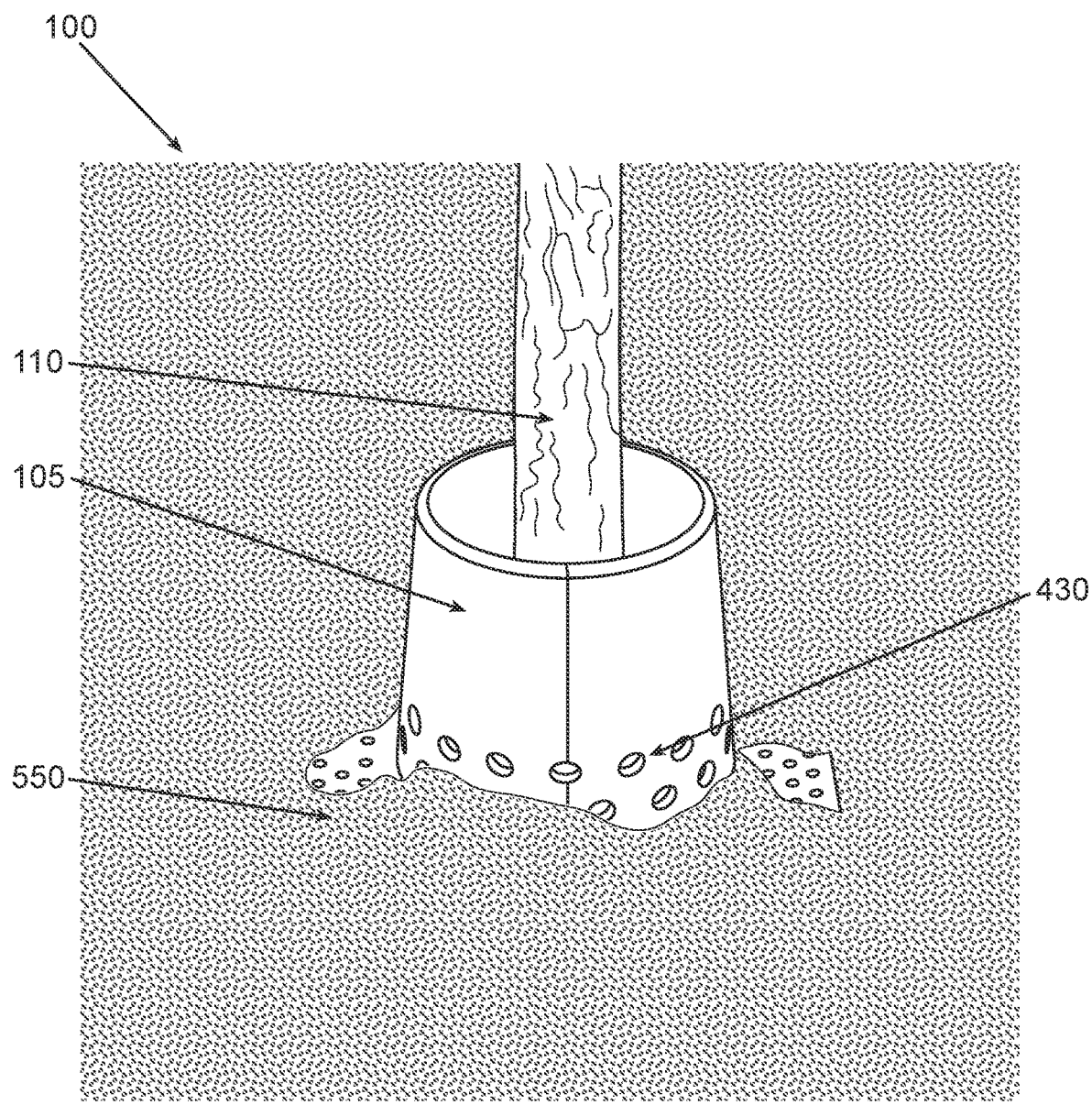
FIG. 5 is a perspective view of a mulch barrier according to an embodiment of the present invention.

FIG. 5 depicts a mulch barrier (105) as previously depicted in FIG. 4 with mulch (550) applied around and about a plant (110). It is contemplated the mulch (550) may be configured on and about the mulch barrier (105) in a "volcano appearance".

FIG. 6 depicts a mulch barrier (105) including integral or detachable spacers, spokes, or struts (215) as previously depicted in FIG. 2. The spacer (215) is adjustable and is configured to be adjustable to adjust the distance of the exterior housing to the tree.

FIG. 7 depicts a mulch barrier (105) with mulch (550) applied around and about a plant (110). It is contemplated the mulch (550) may be configured and held by the mulch barrier (105) in a "volcano appearance" by integral or detachable spokes or spikes (320).

Figure 8:
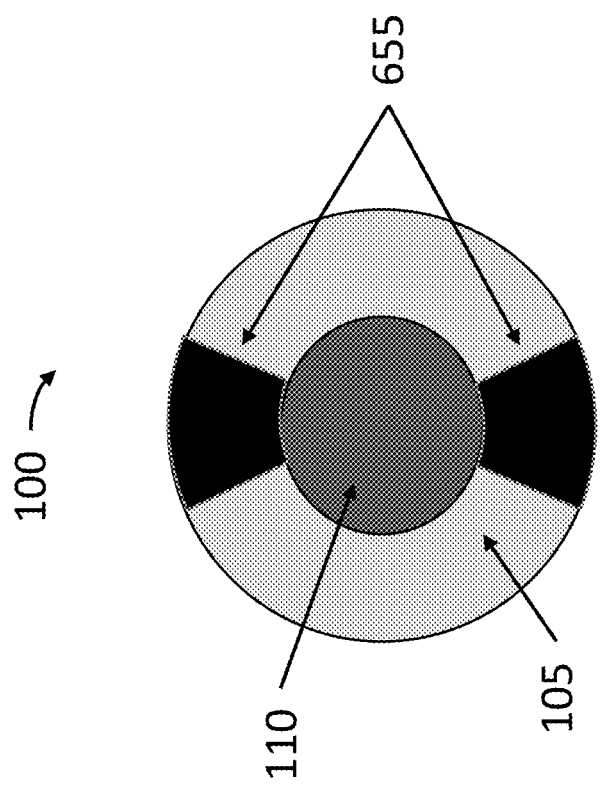
FIG. 8 is a view of a mulch barrier according to an embodiment of the present invention.

FIG. 8 depicts an additional extension unit or units (655), which allows the mulch barrier (105) to expand and contract based upon the size of the plant or tree (110). The extension unit (655) may include a connection point and/or clasp (Not Shown) which allows the extension to be attached or removed from to the mulch barrier (105).

Figure 9:
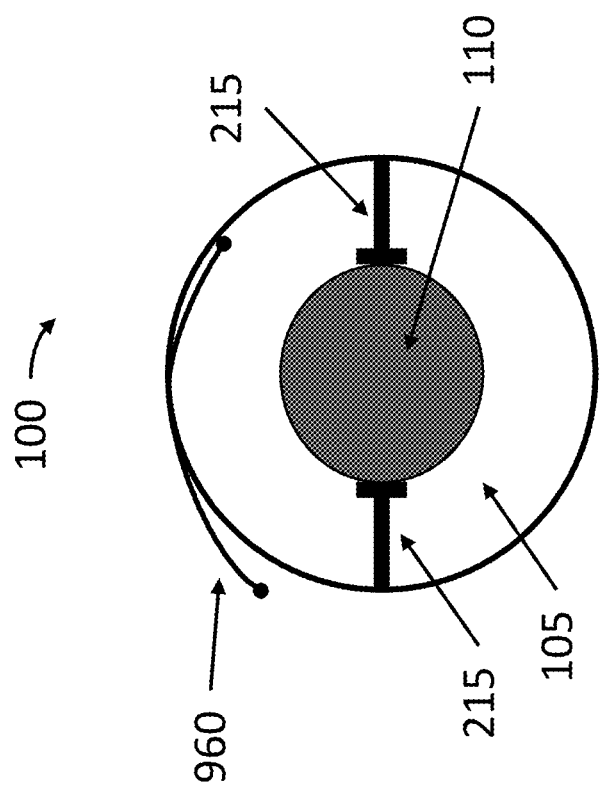
FIG. 9 is a view of a mulch barrier according to an embodiment of the present invention.

FIG. 9 depicts an additional extension unit or units (960), which allows for expansion of the mulch barrier (105) configured to act as an expanding belt or loop which diameter increases as the plant or tree grows, and expands in circumference and displaces the spacers, spokes, or struts (215) abutting the plant or tree (110).

Many and varied configurations of the present inventive method and system are and may be contemplated, dependent upon in at least part and in accordance with the desires of a system user, requirements of the plants protected, and the environment where a plant may be situated.

Accordingly, this invention is not to be limited by the embodiments as described, since these are given by way of example only and not by way of limitation.

Having thus described several embodiments for practicing the inventive method, its advantages and objectives can be easily understood. Variations from the description above may and can be made by one skilled in the art without departing from the scope of the invention, which is to be determined from and by any filed, amended and/or granted claims.

The invention claimed is:

1. A mulch barrier surrounding and protecting the base of a plant, said mulch barrier comprising:
    a rigid or semi-rigid external housing, said external housing having at least one bore to allow the passage of water through said housing, said housing completely surrounding the plant;
    a base connected to said rigid or semi-rigid external housing, said base supporting said external housing;
    at least one spacer, said at least one spacer connected on one end to said external housing and on the other end to a tree, the spacer is adjustable and is configured to control the distance between the external housing and the tree; and
    a ramp member, said ramp member arranged on the exterior of the external housing and comprising at least one spike,
    wherein said ramp member is connected on one end of said external housing and on the other end of said base, and
    wherein said ramp member holds groundcover, mulch or other material in place, thereby protecting the base of the plant.

2. The mulch barrier of claim 1, wherein the external housing of the mulch barrier is made of plastic or a rigid material.

3. The mulch barrier of claim 1, wherein the base includes at least one bore to allow water to flow down through the mulch.

4. The mulch barrier of claim 1, wherein the mulch ramp member includes spikes to hold the mulch in place.

5. The mulch barrier of claim 1, further comprising an extension unit, said extension unit connected to said external housing to allow the external housing to expand and contract based upon the side of the plant.

6. The mulch barrier of claim 5, wherein the extension unit is connected to said external housing via a point and/or clasp.

7. The mulch barrier of claim 1, wherein the base is circular, oval, square, or rectangular.

8. The mulch barrier of claim 1, wherein the housing has a cylindrical shape.

9. The mulch barrier of claim 1, wherein the housing has a plurality of bores.

10. The mulch barrier of claim 1, wherein the base and housing are integrally fused to one another.

11. A mulch barrier surrounding and protecting the base of a plant, said mulch barrier comprising:
   a rigid or semi-rigid external housing, said external housing having at least one bore to allow the passage of water through said housing, said housing completely surrounding the plant;
   a base connected to said rigid or semi-rigid external housing, said base supporting said external housing; and
   a ramp member, said ramp member arranged on the exterior of the external housing and comprising at least one spike,
   wherein said ramp member is connected on one end of said external housing and on the other end of said base,
   wherein said ramp member holds groundcover, mulch or other material in place, thereby protecting the base of the plant,
   wherein the base includes spikes to attach the base to the ground.

12. A mulch barrier surrounding and protecting the base of a plant, said mulch barrier comprising:
   a rigid or semi-rigid external housing, said external housing having at least one bore to allow the passage of water through said housing, said housing completely surrounding the plant;
   a base connected to said rigid or semi-rigid external housing, said base supporting said external housing; and
   a ramp member, said ramp member arranged on the exterior of the external housing and comprising at least one spike,
   wherein said ramp member is connected on one end of said external housing and on the other end of said base,
   wherein said ramp member holds groundcover, mulch or other material in place, thereby protecting the base of the plant,
   wherein the base has a plurality of bores.

* * * * *